United States Patent
Chan et al.

(10) Patent No.: US 8,370,776 B1
(45) Date of Patent: Feb. 5, 2013

(54) METHOD AND APPARATUS FOR COMPILING INTELLECTUAL PROPERTY SYSTEMS DESIGN CORES USING AN INCREMENTAL COMPILE DESIGN FLOW

(75) Inventors: Kevin Chan, Scarborough (CA); Terry Borer, Toronto (CA)

(73) Assignee: Altera Corporation, San Jose, CA (US)

( * ) Notice: Subject to any disclaimer, the term of this patent is extended or adjusted under 35 U.S.C. 154(b) by 551 days.

(21) Appl. No.: 12/157,809

(22) Filed: Jun. 13, 2008

(51) Int. Cl.
*G06F 17/50* (2006.01)
(52) U.S. Cl. ......... 716/105; 716/116; 716/124; 716/131
(58) Field of Classification Search ............. 716/30–139
See application file for complete search history.

(56) References Cited

U.S. PATENT DOCUMENTS

| | | | |
|---|---|---|---|
| 7,197,734 B1* | 3/2007 | Singh et al. | 716/116 |
| 7,890,917 B1* | 2/2011 | Young et al. | 716/117 |
| 2004/0221249 A1* | 11/2004 | Lahner et al. | 716/4 |
| 2005/0165995 A1* | 7/2005 | Gemelli et al. | 710/305 |

OTHER PUBLICATIONS

Altera Corporation, "Using the LogicLock Methodology in the Quartus II Design Software", v3.3, Jun. 2003.*
McLaurin, Teresa. "IEEE Std. 1500 Compliant Wrapper Boundary Register Cell", ARM Research and Development, pp. 1-8, Jun. 15, 2005.*

* cited by examiner

*Primary Examiner* — Vuthe Siek
*Assistant Examiner* — Aric Lin
(74) *Attorney, Agent, or Firm* — L. Cho

(57) ABSTRACT

A method for designing a system on a target device includes compiling an intellectual property (IP) core to be implemented on the target device such that it satisfies user specified requirements for the system. User logic is compiled after the IP core has been compiled to satisfy user specified requirements for the system.

20 Claims, 9 Drawing Sheets

METHOD AND APPARATUS FOR COMPILING INTELLECTUAL PROPERTY SYSTEMS DESIGN CORES USING AN INCREMENTAL COMPILE DESIGN FLOW

TECHNICAL FIELD

An embodiment of the present invention relates to electronic design automation tools for designing systems on target devices. More specifically, embodiments of the present invention relate to a method and apparatus for compiling intellectual property system design cores (IP cores) using an incremental compile design flow.

BACKGROUND

Logic devices such as field programmable gate arrays (FPGAs) are used to implement large systems that may include million of gates and megabits of embedded memory. The complexity of large systems often requires the use of electronic design automation (EDA) tools to create and optimize a design for the system onto physical target devices. Among the procedures performed by EDA tools in a computer aided design (CAD) flow are synthesis, placement, and routing.

The design for the system may include user logic created by an end user, one or more IP cores created by a third party vendor, or a combination of both. An IP core is a block of logic or data that is used to support one or more specific functionalities for the system. As essential elements of design reuse, IP cores are part of the growing EDA industry trend towards repeated use of previously designed components. Some IP cores have the characteristic of being entirely portable such that they may be inserted into any technology or design methodology. Universal Asynchronous Receiver/Transmitters (UARTs), central processing units, Peripheral Component Interconnect (PCI) interfaces, and double data rate (DDR) memory controllers are examples of some components with functionalities that may be implemented using IP cores.

Many types of IP cores that implement standardized functions on target devices are delivered by FPGA vendors and their partners. In many cases, it is difficult to implement the IP core such that the performance of the IP core meets the standard's specification. Typically a target device vendor produces a compiled version of the IP core that is fully placed and routed on a target device. This implementation is analyzed to ensure that it meets a required performance that may be specified by the standard. The target device vendor delivers to the end customer the compiled version of the IP core, including the information needed for the customer to produce the exact placement and routing required to meet the required performance.

SUMMARY

According to an embodiment of the present invention, a method and apparatus for compiling an IP core using incremental compilation is disclosed. Instead of delivering a compiled circuit with placement and routing information to a customer, the IP core is delivered as uncompiled source code. When desiging the system on the target device, an IP section that includes the IP core is partitioned off and compiled separately such that it meets user specified requirements for the system using an incremental compile procedure. After the IP core is compiled, the placement and routing for the IP core is locked down and the other remaining partition(s) of the system are compiled. According to one aspect of the present invention, a determination may be made as to whether IP core has fully registered boundaries on signals that connect the IP core to the user logic. If not, registers from the user logic may be included in the IP section to form a "register bubble" which is compiled together prior to compiling the remaining partition(s). Compilation may include synthesizing, placement, and routing of a partition on the target device.

BRIEF DESCRIPTION OF THE DRAWINGS

The features and advantages of the present invention are illustrated by way of example and are by no means intended to limit the scope of the present invention to the particular embodiments shown.

DETAILED DESCRIPTION

In the following description, for purposes of explanation, specific nomenclature is set forth to provide a thorough understanding of embodiments of the present invention. It will be apparent to one skilled in the art that specific details in the description may not be required to practice the embodiments of the present invention. In other instances, well-known circuits, devices, and programs are shown in block diagram form to avoid obscuring embodiments of the present invention unnecessarily.

Figure 1:
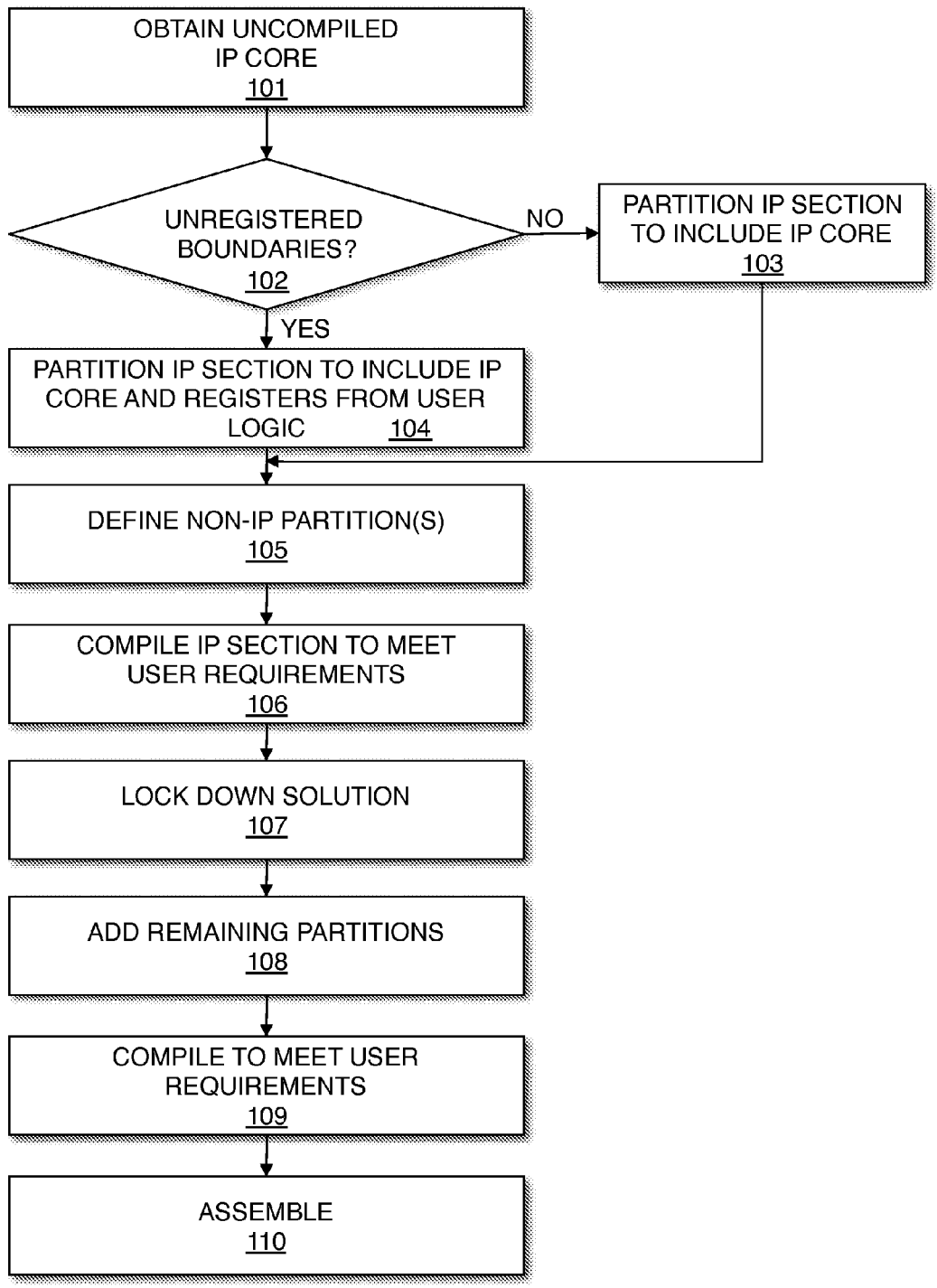
FIG. 1 is a flow chart illustrating a method for compiling an IP core with user logic according to an embodiment of the present invention.

FIG. 1 is a flow chart illustrating a method for compiling an IP core with user logic according to an embodiment of the present invention. According to an embodiment of the present invention, the method illustrated in FIG. 1 may be performed using an EDA tool. At 101, an uncompiled IP core is obtained for a system. According to an embodiment of the present invention, the uncompiled IP core includes a general description of a component or function to be implemented on the system and has not been placed and routed on a specific target device. The IP core may be obtained from a computer-readable medium such as a CDs or DVDs. Alternatively, the IP core may be obtained from a computer system over a network or obtained using a different procedure. The system includes the IP core and non-IP core logic. The non-IP core logic may include a design or description of logic generated by a user (user logic).

At 102, the IP core is evaluated to determine whether it has registered boundaries on signals that connect the IP core to non-IP core logic. If none of the signals connecting the IP core to non-IP core logic is identified to be unregistered, control proceeds to 103. If a signal connecting the IP core to non-IP core logic is identified as being unregistered, control proceeds to 104.

At 103, an IP section is partitioned from the system. According to an embodiment of the present invention, the IP section includes only the IP core.

At 104, an IP section is partitioned from the system. According to an embodiment of the present invention, the IP section includes the IP core and registers from the non-IP core logic. The registers from the non-IP core logic provide registered boundaries for the IP section such that all signals connecting the IP section to logic outside the IP section are registered.

At 105, remaining portion of the system (non-IP section) is partitioned into one or more non-IP partitions.

At 106, the IP section is compiled to meet user requirements. According to an embodiment of the present invention, an incremental compilation procedure is used to compile only the IP section without compiling the non-IP section(s) of the system. This allows the EDA tool to utilize its resources and the resources on the target device to generate an optimal solution for the IP section which may include more complicated logic that may require more attention and resources. According to an embodiment of the present invention, compiling the IP section includes performing synthesis, placement, and routing on the IP section. The EDA tool may utilize various techniques for performing synthesis, placement, and routing including incremental placement, logic replication, functional decomposition, compound duplication, physical synthesis, re-mapping, adjustment of fitter effort levels, seed sweep, and other techniques.

Synthesis, placement, and routing is performed to meet user requirements which may include timing requirements for the system, placement/location requirements for portions of the IP core, pin out requirements, and/or other types of requirements. According to an embodiment of the present invention, the one or more non-IP partitions are set to empty. By setting the non-IP partitions to empty, only the IP partition is visible to the EDA tool during the compilation procedure.

At 107, the solution generated from compiling the IP section is preserved. According to an embodiment of the present invention, the solution is "locked down" such that the EDA tool utilizes the placement and routing results generated at procedure 106 and makes the resources identified for the IP section unavailable to the one or more non-IP partitions.

At 108, the remaining partitions or one or more non-IP partitions are added to the IP section. This may be achieved by resetting the one or more non-IP partitions from empty to their original state. By adding the non-IP partitions to the IP section, the entire description of the section is visible to the EDA tool.

At 109, the one or more non-IP partitions are compiled with the IP section to meet user requirements. Synthesis, placement, and routing solutions are found for the one or more non-IP partitions using resources other than those already locked down for the IP section. The techniques described with reference to procedure 106 may be used for the compilation at 109.

The compilation of the IP section at 106 and the non-IP partition(s) at 109 may involve one or more iterations where various procedures and techniques may be applied to optimize the design and allow the design to meet the user requirements. According to an embodiment of the present invention, a user may be input preferences as to compilation procedures and techniques for the one or more iterations. Alternatively, the procedures and techniques may be altered automatically by the EDA tool or by a script written to run the compilation of the IP section and the non-IP partition(s).

At 110, an assembly procedure is performed. The assembly procedure involves creating a data file that includes information determined and/or results generated by the procedure described by 101-109. The data file may be a bit stream that may be used to program the target device. According to an embodiment of the present invention, the procedures illustrated in FIG. 1 may be performed by an EDA tool executed on a first computer system. The data file generated may be transmitted to a second computer system to allow the design of the system to be further processed. Alternatively, the data file may be transmitted to a second computer system which may be used to program the target device according to the system design. It should be appreciated that the design of the system may also be output in other forms such as on a display device or other medium.

The procedure described in FIG. 1 provides an improved methodology for implementing an IP core on a target device. Instead of downloading a completely compiled IP core that has been placed and routed, the described methodology allows the IP core to be compiled to comply with user requirements specific to the system. By performing incremental compilation where the IP core is compiled before other non-IP core logic/user logic, allocation of resources on the target device may be allowed to the more timing critical logic. Incremental compilation also guarantees the results of the previous compiled IP core in the current system.

Some IP cores are implemented in two separate modules where an IP controller that controls the IP core is designed by a user and implemented by user logic. Since the IP controller may be tightly coupled with the IP core itself, in some instances it may be desirable to compile the IP controller with the IP core for delay budgeting purposes. According to an embodiment of the present invention, both the IP core and the IP controller are partitioned together in the IP section and are compiled prior to compiling other user logic. The solution generated from this compilation may be locked down and preserved for the final design.

Figure 2:
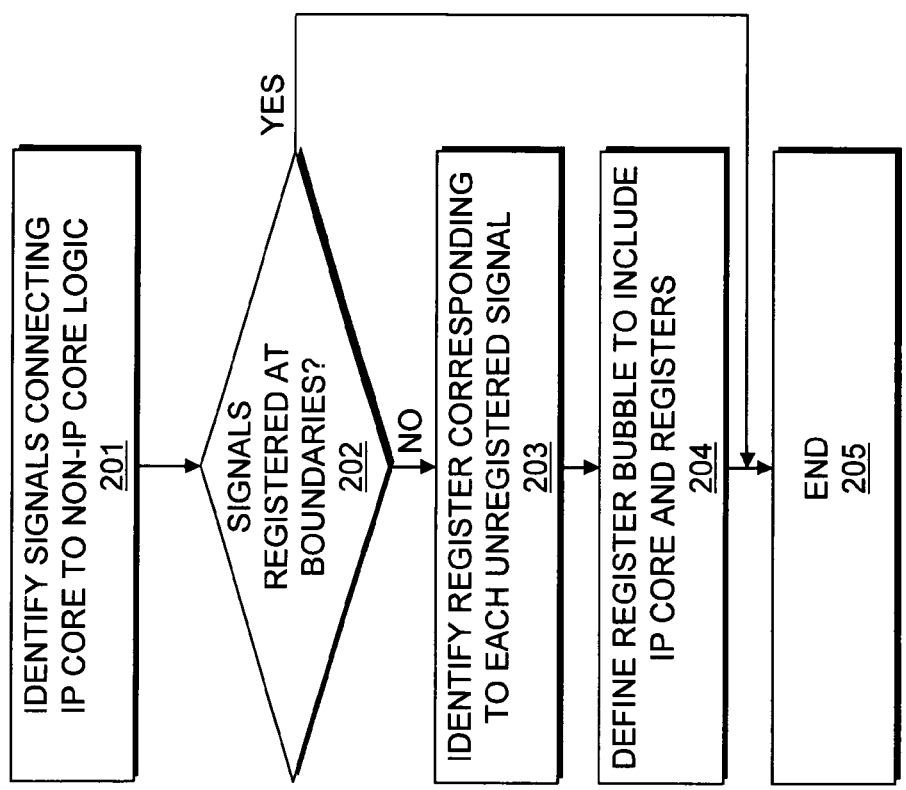
FIG. 2 is a flow chart illustrating a method for partitioning an IP section to include registered boundaries according to an embodiment of the present invention.

FIG. 2 is a flow chart illustrating a method for partitioning an IP section to include registered boundaries according to an embodiment of the present invention. The procedure illustrated in FIG. 2 may be used to implement procedure 104 according to an embodiment of the present invention. At 201, signals in an IP core that connect the IP core to non-IP core logic are identified.

At 202, a determination is made as to whether the signals are registered at the boundaries of the IP core. If a determination is made that a signal is not registered at the boundary of the IP core, control proceeds to 203. If all signals are registered at the boundaries of the IP core, control proceeds to 205.

At 203, for each non-registered signal in the IP core, a register in the non-IP core logic that corresponds to the non-registered signal is identified. A register may correspond to a non-registered signal if it is in its path.

At 204, a register bubble is defined that includes the IP core and the identified register(s). The register bubble is recognized as a new IP core. The new IP core may be partitioned separately from and compiled separately from the other logic in the system.

At 205, control terminates the procedure.

According to an embodiment of the present invention, the procedure described with reference to FIG. 2 may be performed manually by a user, by an EDA tool, or by a combination of both the user and the EDA tool.

According to an alternate embodiment of the present invention, instead of forming a register bubble by identifying and including registers corresponding to each unregistered signal in a register bubble, the entire logic of an IP controller may be incorporated into the register bubble such that the new IP core includes both the original IP core and the entire IP controller.

Figure 3A:
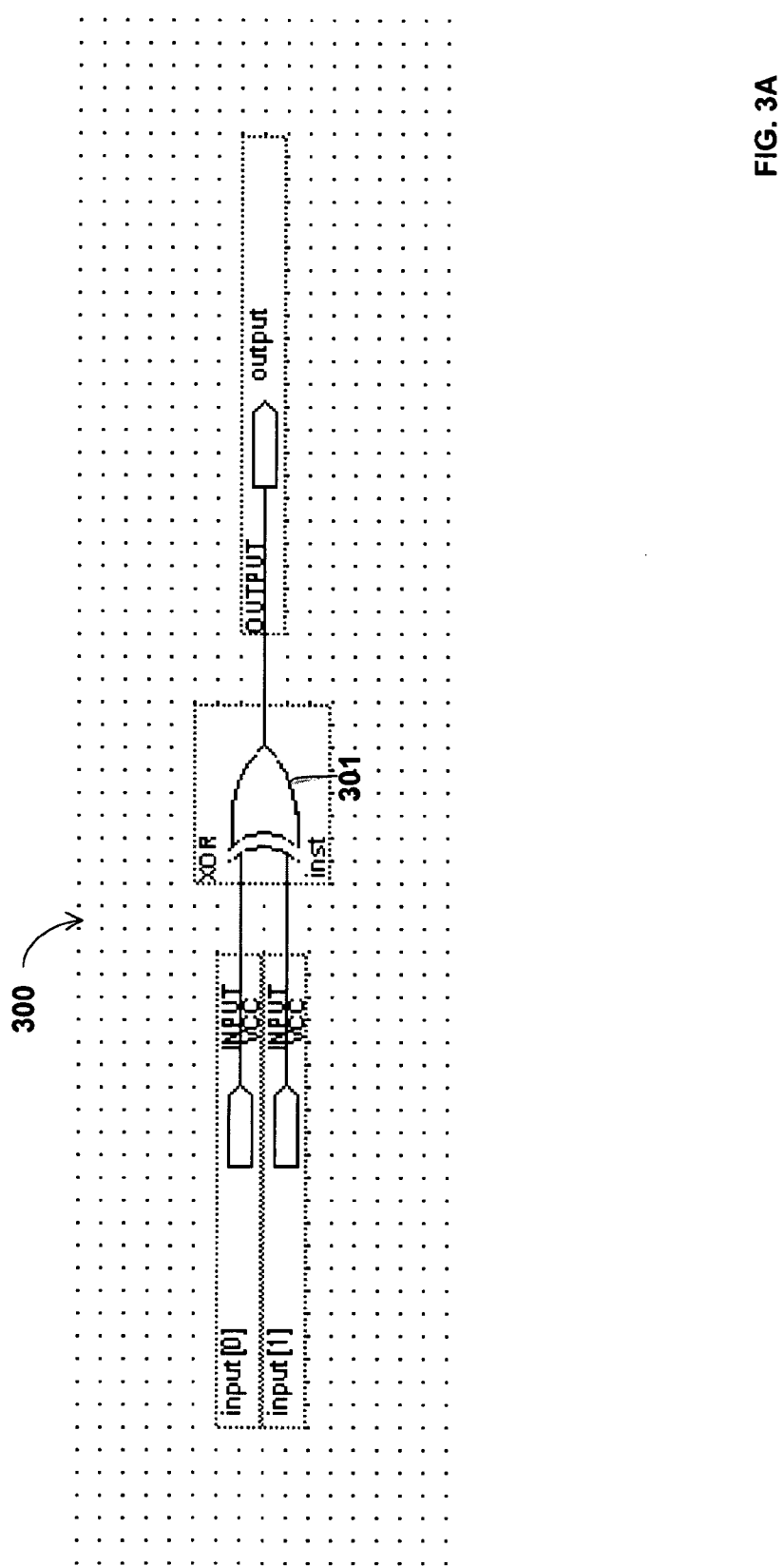
FIGS. 3a-3c illustrate an example of partitioning an IP section according to an embodiment of the present invention.
Figure 3B:
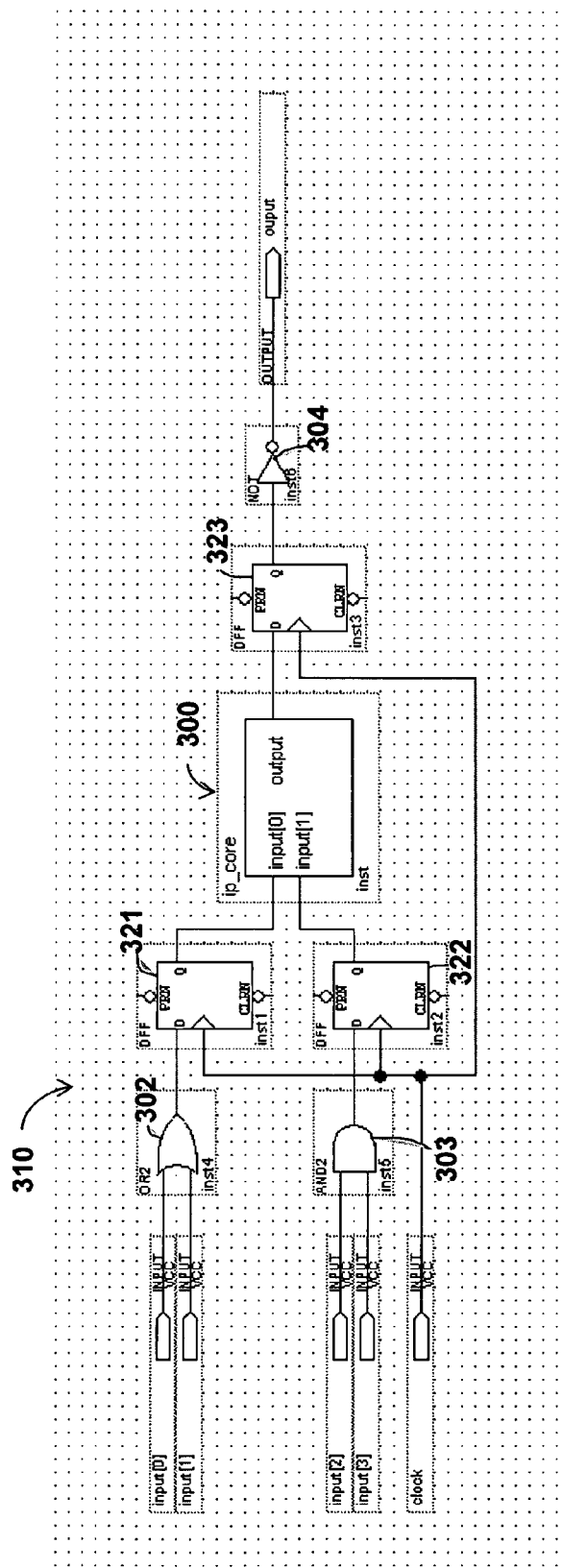
Figure 3C:
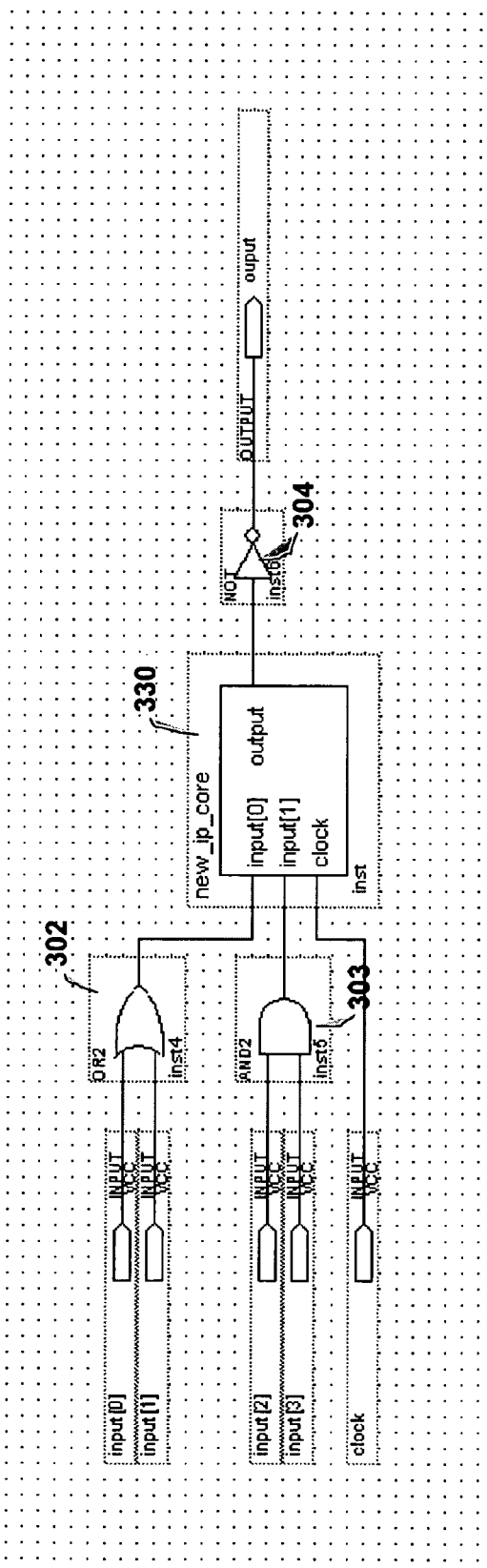

FIGS. 3a-3c illustrate examples of partitioning an IP section that includes a register bubble according to an embodiment of the present invention. FIG. 3a illustrates an IP core 300. The IP core includes a logic component 301 that performs an XOR function. The IP core 300 is often treated like a black box by traditional EDA tools and may be placed independently from non-IP core logic. This is problematic when unregistered inputs/outputs are placed sub-optimally with respect to the user's logic.

FIG. 3b illustrates a system 310 that includes the IP core 300 which is now illustrated as a block. The system 310 includes other components from the non-IP core logic. The non-IP core logic may be user logic that includes a logic component 302 that performs an OR function, a logic component 303 that performs an AND function, a logic component 304 that performs an invert function, and a plurality of registers 321-323.

A register bubble may be created from the registers 321 and 322 immediately feeding the IP core 300 and register 323 immediately being fed by the IP core 300. The register bubble may be recognized as a new IP core. Register bubbles may be formed around IP cores with unregistered boundaries using existing logic surrounding the IP core. Register bubbles promote good incremental design techniques.

FIG. 3c illustrates a new IP core 330 which includes the original IP core 300 (shown in FIG. 3b) and registers 321-323 (shown in FIG. 3b) all represented by block 330. The new IP core 330 absorbs registers 321-323 which provide registered boundaries. By creating register bubbles, IP cores may be better customized to each user's design. The new IP core 330 may be partitioned from other components of the system and compiled separately. The placement and routing solutions generated from the incremental compilation may be locked down to guarantee the preferred solution for subsequent incremental compiles.

Figure 4:
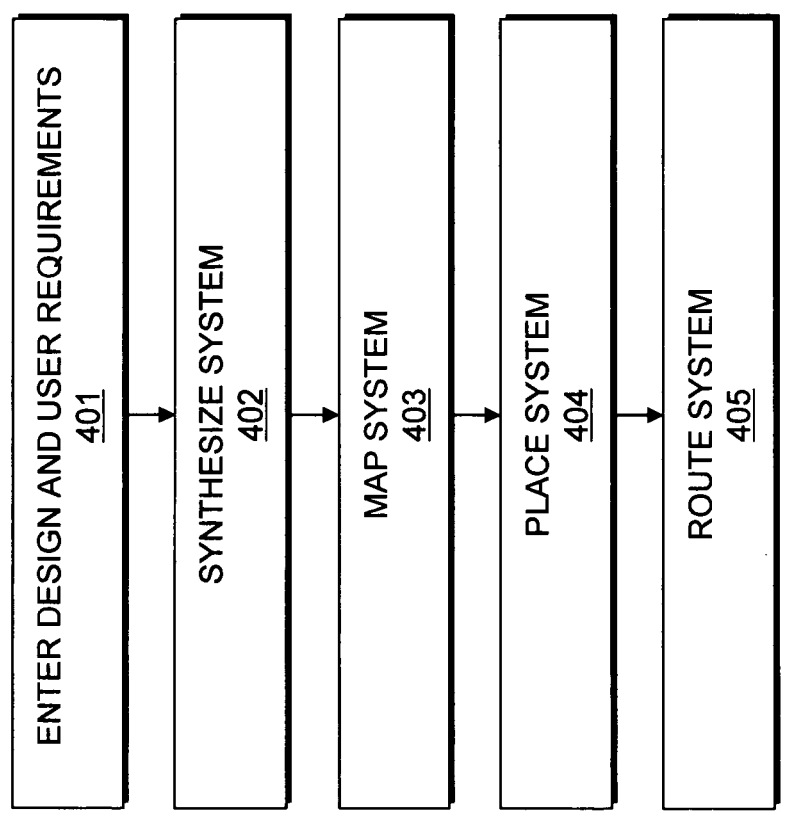
FIG. 4 is a flow chart illustrating a method for compiling a partition according to an embodiment of the present invention.

FIG. 4 is a flow chart illustrating a method for compiling a partition according to an embodiment of the present invention. According to an embodiment of the present invention, the procedure illustrate in FIG. 4 may be used to implement the compilation procedures of 106 and 109 shown in FIG. 1. At 401, a partition for a design of a system is entered into a design tool. The design may be described at a gate level or in a more abstract level. The design may be described in terms of a hardware description language (HDL) such as VHDL or Verilog. The target device may be an ASIC, structured ASIC, FPGA, programmable logic device (PLD), or other target device. The user requirements for the entire system are also entered into the design tool. The user requirements may include global requirements such as timing requirements for the system, placement/location requirements, pin out requirements, and/or other types of requirements.

At 402, the design for the system is synthesized. Synthesis includes generating a logic design of the system to be implemented. According to an embodiment of the present invention, synthesis generates an optimized logical representation of the system from a HDL design definition. The optimized logical representation of the system may include a representation that has a minimized number of functional blocks and registers, such as logic gates and logic elements, required for the system.

At 403, technology mapping is performed on the optimized logic design. Technology mapping includes determining how to implement logic gates and logic elements in the optimized logic representation with resources (components) available on the target device. According to an embodiment of the present invention, a netlist is generated from mapping. This netlist may be an optimized technology-mapped netlist generated from the I-IDL.

At 404, the mapped logical system design is placed. Placement works on the optimized technology-mapped netlist to produce a placement for each of the functional blocks. According to an embodiment of the present invention, placement includes fitting the system on the target device by determining which components on the logic design are to be used for specific logic elements, and other function blocks. Placement may include clustering which involves grouping logic elements together to form the logic clusters present on the target device.

At 405, it is determined which routing resources should be used to connect the components in the logic design implementing the functional blocks of the system. During routing, routing resources on the target device are allocated to provide interconnections between logic gates, logic elements, and other components on the target device. The routing procedure may be performed by a router in an EDA tool that utilizes routing algorithms.

It should be appreciated that procedures 401-405 may be applied to one or more partitions of a design for a system. Furthermore, procedures 401-405 may be applied to more than one partitions of a design for a system where one of the partitions has solutions that have been locked down.

By having an EDA tool partition an IP section that includes the IP core and compile the IP section first and separately from other partitions in a system to satisfy user requirements, embodiments of the present invention allow the delivery of an IP core as uncompiled source code. No longer do IP core venders need to compiled and deliver unique results for every part number in a target device family corresponding to each size of chip, package type, and speed grade. Also, the placement and routing performed by embodiments of the present invention provide a solution that is specific to the non-IP core/user logic of a system and the user requirements for the system. This is an improvement from prior approaches which delivered a generic placement and routing for each IP core that might not be optimal for a specific system.

By creating registered boundaries in a new IP core using existing registers from non-IP logic/user logic, as illustrated in FIGS. 2 and 3a-3c, an improved version of the IP core is create that does not introduce any extra latency since the registers are from the original system design itself. The newly created IP core includes both the original IP core and surrounding logic necessary to make it registered.

Embodiments of the present invention uses a top-down design flow that preserves performance effectively since the netlist, placement, and routing information is stored in the same top-level project. Netlists need not be imported and extra location constraints need not be added.

Figure 5:
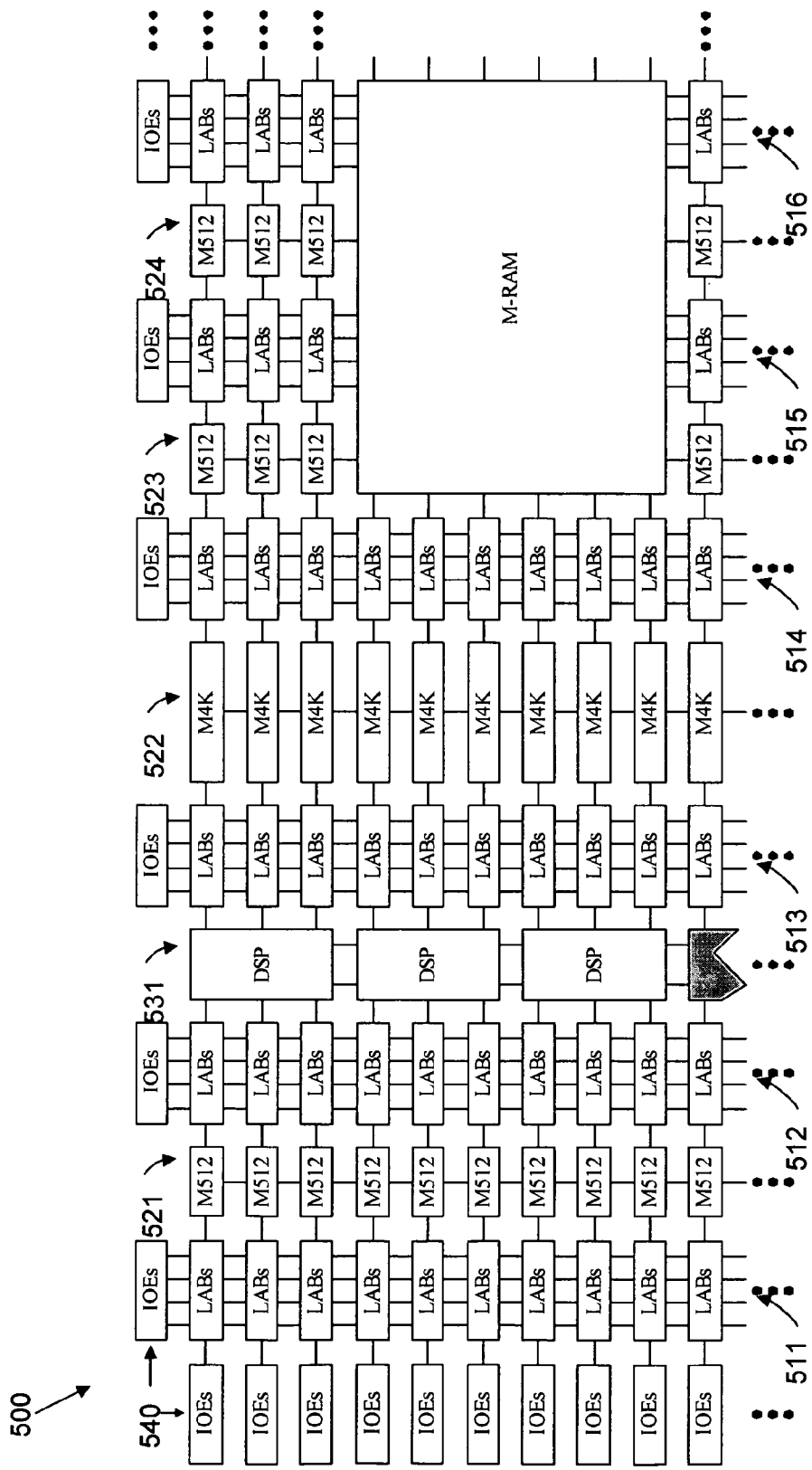
FIG. 5 illustrates a field programmable gate array (FPGA) according to an embodiment of the present invention.

FIG. 5 illustrates an exemplary target device 500 in which a system may be implemented on 500 utilizing an FPGA according to an embodiment of the present invention. According to one embodiment, the target device 500 is a chip having a hierarchical structure that may take advantage of wiring locality properties of circuits formed therein.

The target device 500 includes a plurality of logic-array blocks (LABs). Each LAB may be formed from a plurality of logic blocks, carry chains, LAB control signals, (lookup table) LUT chain, and register chain connection lines. A logic block is a small unit of logic providing efficient implementation of user logic functions. A logic block includes one or more combinational cells, where each combinational cell has a single output, and registers. LABs are grouped into rows and columns across the target device 500. Columns of LABs are shown as 511-516. It should be appreciated that the logic block may include additional or alternate components.

The target device 500 includes memory blocks. The memory blocks may be, for example, dual port random access memory (RAM) blocks that provide dedicated true dual-port, simple dual-port, or single port memory up to various bits wide at up to various frequencies. The memory blocks may be grouped into columns across the target device in between selected LABs or located individually or in pairs within the target device 500. Columns of memory blocks are shown as 521-524.

The target device 500 includes digital signal processing (DSP) blocks. The DSP blocks may be used to implement multipliers of various configurations with add or subtract features. The DSP blocks include shift registers, multipliers, adders, and accumulators. The DSP blocks may be grouped into columns across the target device 500 and are shown as 531.

The target device 500 includes a plurality of input/output elements (IOEs) 540. Each IOE feeds an I/O pin (not shown) on the target device 500. The IOEs are located at the end of LAB rows and columns around the periphery of the target device 500.

The target device 500 includes LAB local interconnect lines (not shown) that transfer signals between LEs in the same LAB, a plurality of row interconnect lines ("H-type wires") (not shown) that span fixed distances, and a plurality of column interconnect lines ("V-type wires") (not shown) that operate similarly to route signals between components in the target device.

FIG. 5 illustrates an exemplary embodiment of a target device. It should be appreciated that a system may include a plurality of target devices, such as that illustrated in FIG. 5, cascaded together. It should also be appreciated that the target device may include programmable logic devices arranged in a manner different than that on the target device 500. A target device may also include FPGA resources other than those described in reference to the target device 500. Thus, while the invention described herein may be utilized on the architecture described in FIG. 5, it should be appreciated that it may also be utilized on different architectures, such as those employed by Altera® Corporation in its APEXv, Stratix™, Cyclone™, Stratix™ II, and Cyclone™ II families of chips and those employed by Xilinx® Inc. in its Virtex™ and Virtex™ II, and Virtex IV™ line of chips.

Figure 6:
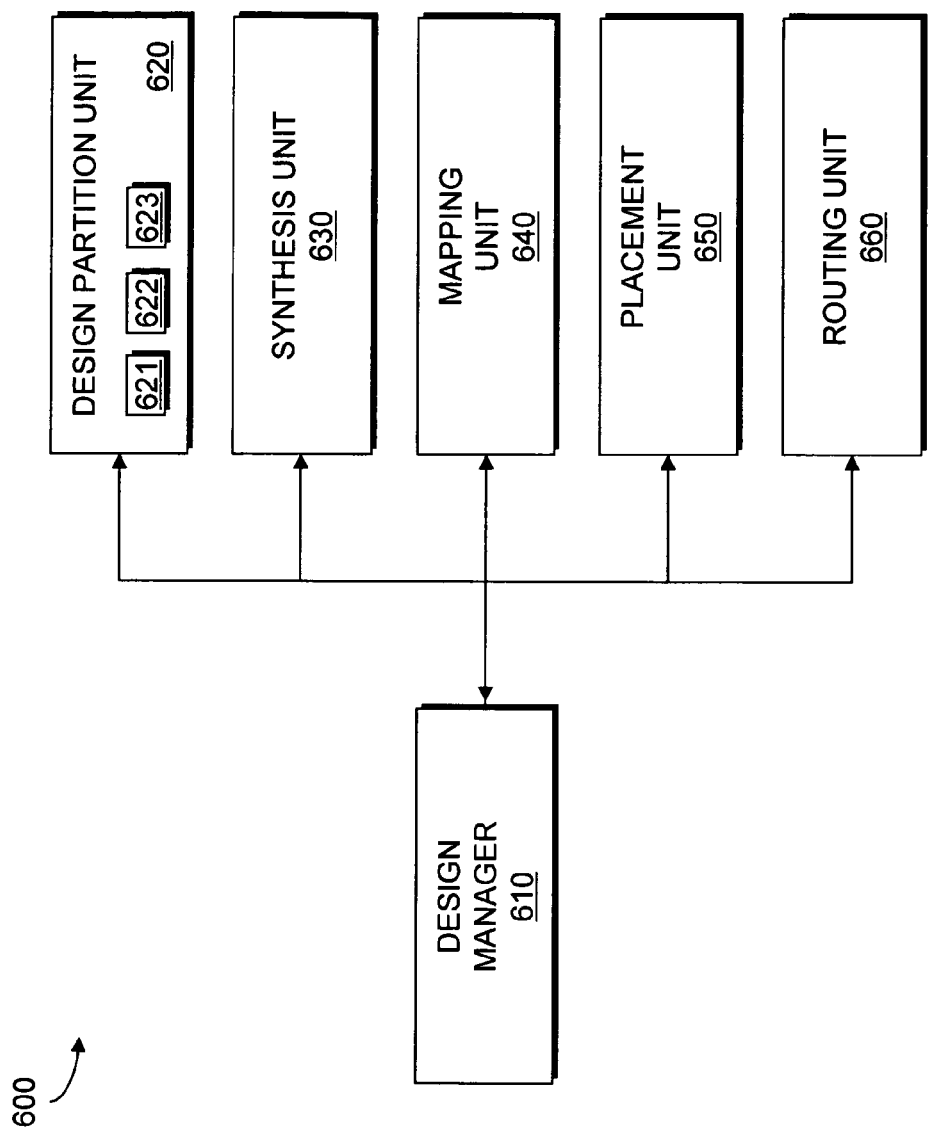
FIG. 6 illustrates a system designer according to an embodiment of the present invention.

FIG. 6 illustrates a system designer 600 according to an embodiment of the present invention. The system designer 600 may be an EDA tool for designing a system on a target device. The target device may be, for example, an ASIC, a structured ASIC, an FPGA, a PLD, or other circuitry. Furthermore the logic design may be implemented using semiconductor or nanoelectronic technology. FIG. 6 illustrates software modules implementing an embodiment of the present invention. According to one embodiment, system design may be performed by a computer system executing sequences of instructions represented by the software modules shown in FIG. 6. Execution of the sequences of instructions causes the computer system to support system design as will be described hereafter. In alternate embodiments, hard-wire circuitry may be used in place of or in combination with software instructions to implement the present invention. Thus, the present invention is not limited to any specific combination of hardware circuitry and software. The system designer 600 includes a designer manager 610. The designer manager 610 receives a design for a system. The design for the system may include an IP core and non-IP core logic such as user logic. The design may be described at a gate level or in a more abstract level. The design may be described in terms of an HDL such as VI-IDL or Verilog. The target device may be an ASIC, structured ASIC, FPGA, PLD, or other target device. The designer manager 610 is connected to and transmits data between the components of the system designer 600.

The system designer 600 includes a design partition unit 620. The design partition unit 620 identifies an IP section which it partitions from the system. According to an embodiment of the present invention, the IP section includes the IP core and may include additional registers from other portions of the design for the system. The design partition unit 620 includes a signal identification unit 621 to determine whether the IP core has registered boundaries on signals connecting the IP core to user logic. The design partition unit 620 also includes a register bubble unit 622 to create a register bubble that includes the IP core and identified registers from the user logic if the IP core does not have registered boundaries on the signals. The identified registers from the user logic operate to register the signals connecting the IP core to the user logic. It should be appreciated that the register bubble unit 622 may include an entire IP controller with the IP core in the register bubble. The design partition unit 620 transmits the IP section which includes a new IP core with a register bubble to the other components in the system designer for synthesis, mapping, placement, and routing according to user requirements for the system.

The design partition unit 620 includes a lock down unit 623 to lock down placement and routing of the IP section prior to placing and routing the other remaining partitions in the system. After the placement and routing of the IP section are locked down, the compiled IP section and the non-compiled remaining sections are transmitted to the other components in the system designer for synthesis, mapping, placement, and routing.

Block 630 represents a synthesis unit that performs synthesis. The synthesis unit 630 generates a logic design of a system to be implemented in the target device. According to an embodiment of the system designer 600, the synthesis unit 630 takes a conceptual HDL design definition and generates an optimized logical representation of the system. The optimized logical representation of the system generated by the synthesis unit 630 may include a representation that has a minimized number of functional blocks and registers, such as logic gates and logic elements, required for the system. Alternatively, the optimized logical representation of the system generated by the synthesis unit 630 may include a representation that has a reduced depth of logic and that generates a lower signal propagation delay.

Block 640 represents a mapping unit that performs technology mapping. The mapping unit 640 determines how to implement the functional blocks and registers in the optimized logic representation utilizing specific resources on a target device thus creating an optimized "technology-mapped" netlist. The technology-mapped netlist illustrates how the resources (components) on the target device are utilized to implement the system.

Block 650 represents a placement unit that performs placement. The placement unit 650 places the system on to the target device by determining which components or areas on the target device are to be used for specific functional blocks and registers. According to an embodiment of the system designer 600, the placement unit 650 first determines how to implement portions of the optimized logic design in clusters. Clusters may represent a subset of the components on the logic design. A cluster may be represented, for example, by a number of standard cells grouped together. In this embodiment, after portions of the optimized logic design are implemented in clusters, the clusters may be placed by assigning the clusters to specific positions on the target device. The placement unit 650 may utilize a cost function in order to determine a good assignment of resources on the target device.

Block 660 represents a routing unit that performs routing. The routing unit 660 determines the routing resources on the target device to use to provide interconnection between the components implementing functional blocks and registers of the logic design.

According to an embodiment of the system designer 600, the design manager 610 performs an assembly procedure that creates a data file that includes the design of the system generated by the system designer 600. The data file may be a bit stream that may be used to program the target device. The design manager 610 may output the data file so that the data file may be stored or alternatively transmitted to a separate machine used to program the target device. It should be appreciated that the design manager 610 may also output the design of the system in other forms such as on a display device or other medium.

Figure 7:
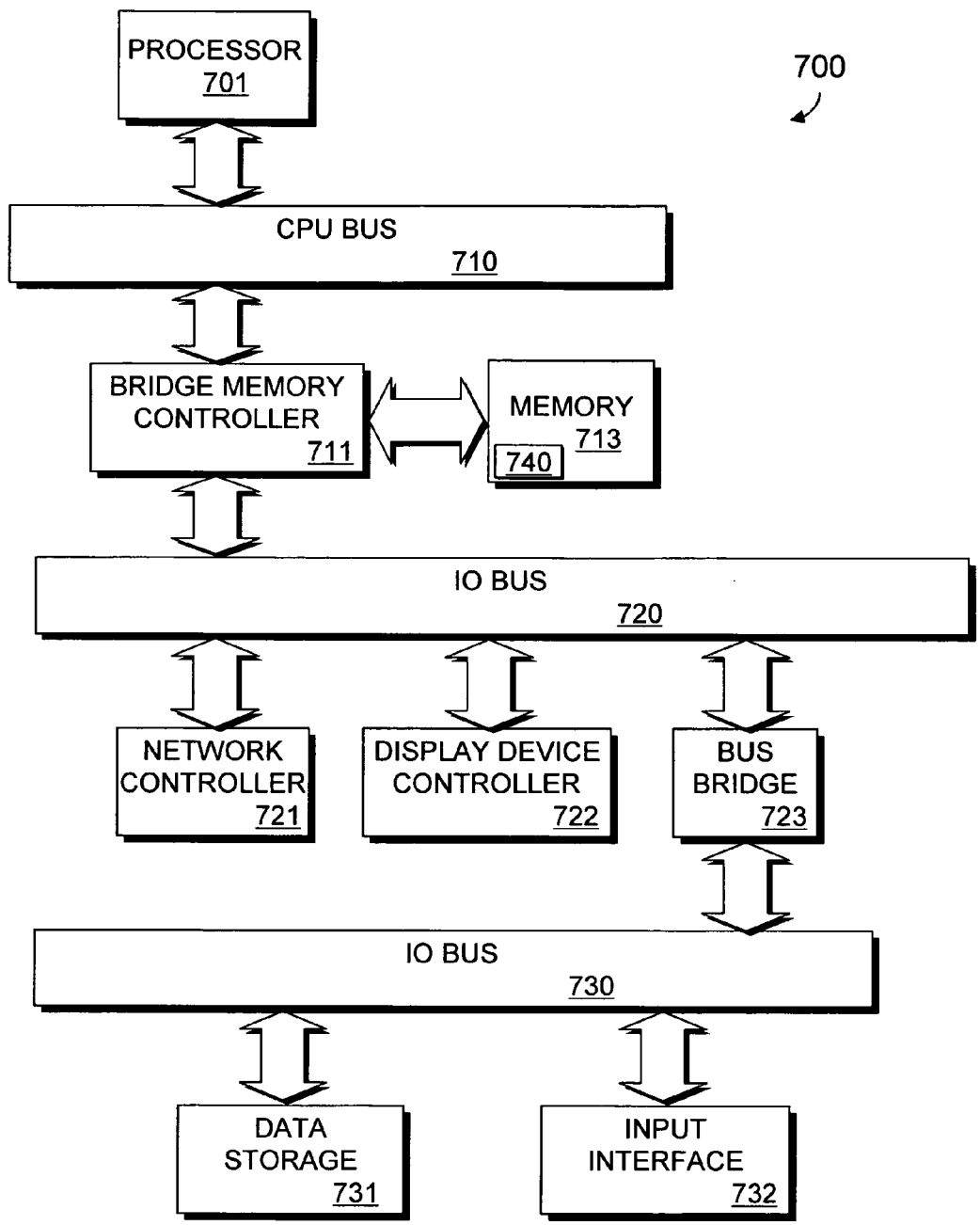
FIG. 7 illustrates a computer system that is used to implement the system designer according to an embodiment of the present invention.

FIG. 7 is a block diagram of an exemplary computer system 700 in which an example embodiment of the present invention resides. The computer system 700 may be used to implement the system designer 900 shown in FIG. 9. The computer system 700 includes a processor 701 that process data signals. The processor 701 is coupled to a CPU bus 710 that transmits data signals between processor 701 and other components in the computer system 700.

The computer system 700 includes a memory 713. The memory 713 may be a dynamic random access memory device, a static random access memory device, and/or other memory device. The memory 713 may store instructions and code represented by data signals that may be executed by the processor 701. A cache memory (not shown) may reside inside processor 701 that stores data signals stored in memory 713. The cache speeds access to memory by the processor 701 by taking advantage of its locality of access. In an alternate embodiment of the computer system 700, the cache resides external to the processor 701. A bridge memory controller 711 is coupled to the CPU bus 710 and the memory 713. The bridge memory controller 711 directs data signals between the processor 701, the memory 713, and other components in the computer system 700 and bridges the data signals between the CPU bus 710, the memory 713, and a first IO bus 720.

The first IO bus 720 may be a single bus or a combination of multiple buses. The first IO bus 720 provides communication links between components in the computer system 700. A network controller 721 is coupled to the first IO bus 720. The network controller 721 may link the computer system 700 to a network of computers (not shown) and supports communication among the machines. A display device controller 722 is coupled to the first IO bus 720. The display device controller 722 allows coupling of a display device (not shown) to the computer system 700 and acts as an interface between the display device and the computer system 700.

A second JO bus 730 may be a single bus or a combination of multiple buses. The second 10 bus 730 provides communication links between components in the computer system 700. A data storage device 731 is coupled to the second 10 bus 730. The data storage device 731 may be a hard disk drive, a floppy disk drive, a CD-ROM device, a flash memory device or other mass storage device. An input interface 732 is coupled to the second 10 bus 730. The input interface 732 may be, for example, a keyboard and/or mouse controller or other input interface. The input interface 732 may be a dedicated device or can reside in another device such as a bus controller or other controller. The input interface 732 allows coupling of an input device to the computer system 700 and transmits data signals from an input device to the computer system 700. A bus bridge 723 couples the first IO bus 720 to the second 10 bus 730. The bus bridge 723 operates to buffer and bridge data signals between the first IO bus 720 and the second 10 bus 730. It should be appreciated that computer systems having a different architecture may also be used to implement the computer system 700.

A system designer 740 may reside in memory 713 and be executed by processor 701. The system designer 740 may operate to synthesize a system, place the system on a target device, route the system, and perform physical synthesis for the system, where different optimization strategies are performed.

FIGS. 1, 2, and 4 are flow charts illustrating methods according to embodiments of the present invention. The techniques illustrated in these figures may be performed sequentially, in parallel or in an order other than that which is described. The techniques may be also be performed one or more times. It should be appreciated that not all of the techniques described are required to be performed, that additional techniques may be added, and that some of the illustrated techniques may be substituted with other techniques.

Embodiments of the present invention may be provided as a computer program product, or software, that may include an article of manufacture on a machine accessible or machine readable medium having instructions. The instructions on the machine accessible or machine readable medium may be used to program a computer system or other electronic device. The machine-readable medium may include, but is not limited to, floppy diskettes, optical disks, CD-ROMs, and magneto-optical disks or other type of media/machine-readable medium suitable for storing or transmitting electronic instructions. The techniques described herein are not limited to any particular software configuration. They may find applicability in any computing or processing environment. The terms "machine accessible medium" or "machine readable medium" used herein shall include any medium that is capable of storing, or encoding a sequence of instructions for execution by the machine and that cause the machine to perform any one of the methods described herein. Furthermore, it is common in the art to speak of software, in one form or another (e.g., program, procedure, process, application, module, unit, logic, and so on) as taking an action or causing a result. Such expressions are merely a shorthand way of stating that the execution of the software by a processing system causes the processor to perform an action to produce a result. Thus, it should be appreciated that the methodology of delivering an IP core to an end user and the methodology of compiling the IP core with non-IP logic/user logic may be delivered to a user as a script according to an embodiment of the present invention. The script may include a list of commands that can be executed with minimal or no user interaction.

In the foregoing specification embodiments of the invention has been described with reference to specific exemplary embodiments thereof. It will, however, be evident that various modifications and changes may be made thereto without departing from the broader spirit and scope of the embodiments of the invention. The specification and drawings are, accordingly, to be regarded in an illustrative rather than restrictive sense.

What is claimed is:

1. A method for designing a system on a target device, the method comprising:
   determining whether third party logic has registered boundaries on signals coupling the third party logic to user logic;
   including registers from the user logic with the third party logic to provide registered boundaries on the signals when compiling the third party logic in response to determining that the third party logic has unregistered boundaries on the signals;
   compiling the third party logic to be implemented on the target device, wherein the compiling satisfies user specified placement and routing requirements for the system; and
   compiling the user logic after the third party logic has been compiled, wherein at least one of the determining, including, and compilings is performed by a processor.

2. The method of claim 1, further comprising:
   partitioning the third party logic from the user logic; and
   setting the user logic partition to empty.

3. The method of claim 1, further comprising locking down routing of the third party logic, determined from compiling the third party logic, prior to compiling the user logic.

4. The method of claim 1, wherein compiling the third party logic comprises:
   synthesizing a design for the third party logic;
   placing the third party logic on the target device; and
   routing the third party logic on the target device.

5. The method of claim 1, wherein the user specified requirements comprises timing requirements for the system.

6. The method of claim 1, wherein the user specified requirements comprises placement requirements for the system.

7. The method of claim 1, wherein the user specified requirements comprises pin out requirements for the system.

8. The method of claim 1, wherein the third party logic comprises a portable description of a function.

9. The method of claim 1, further comprising programming the target device with the compiled third party logic and compiled user logic.

10. The method of claim 1, wherein including registers from the user logic with the third party logic comprises:
    identifying a non-registered signal in the third party logic that is connected to the user logic;
    identifying a register in the user logic that corresponds to the non-registered signal; and
    recognizing the register in the user logic as part of the third party logic for the purpose of partitioning and compilation.

11. A non-transitory machine readable medium including sequences of instructions, the sequences of instructions including instructions which when executed cause the machine to perform a method comprising:
    determining whether third party logic has registered boundaries on signals connecting the third party logic to user logic;
    partitioning a section in a system design to include the third party logic and registers from the user logic if the third party logic does not have registered boundaries on the signals; and
    compiling the section to be implemented on a target device such that it satisfies user specified requirements for the system prior to compiling other partitions.

12. The non-transitory machine readable medium of claim 11, wherein the third party logic includes a controller.

13. The non-transitory machine readable medium of claim 11, wherein the method further comprises setting the user logic partition to empty.

14. The non-transitory machine readable medium of claim 11, wherein the method further comprises locking down routing of the third party logic, determined from compiling the section, prior to compiling the other partitions.

15. The non-transitory machine readable medium of claim 11, wherein compiling the section comprises:
    synthesizing a design for the section;
    placing the section on the target device; and
    routing the section on the target device.

16. The non-transitory machine readable medium of claim 11, wherein the method further comprises compiling remaining partitions.

17. The non-transitory machine readable medium of claim 16, wherein the method further comprises programming the target device with the compiled section and the compiled remaining partitions.

18. A system designer comprising:
    a design partition unit operable to partition a section in a system design to include third party logic, wherein the design partition unit is operable to partition the section to include the third party logic and registers from a user logic if the third party logic does not have registered boundaries on signals; and
    placement and routing units operable to place and route the third party logic to be implemented on a target device, such that it satisfies user specified requirements for a system, prior to performing place and route on other partitions, wherein the system designer is implemented on a computer system.

19. The system designer of claim 18, wherein the design partition unit comprises a signal identification unit operable to determine whether the third party logic has registered boundaries on the signals connecting the third party logic to a user logic.

20. The system designer of claim 18, further comprising a lock down unit operable to lock down routing of the section prior to routing the other partitions.

* * * * *